(12) United States Patent
Michel

(10) Patent No.: US 7,921,512 B2
(45) Date of Patent: Apr. 12, 2011

(54) ASSEMBLY FOR GUIDING THE LONGITUDINAL SLIDING MOVEMENT OF A SUB-ASSEMBLY

(75) Inventor: Dominique Michel, La Varenne Saint Hillaire (FR)

(73) Assignee: Adder, Colomiers (FR)

( * ) Notice: Subject to any disclaimer, the term of this patent is extended or adjusted under 35 U.S.C. 154(b) by 427 days.

(21) Appl. No.: 12/093,142

(22) PCT Filed: Nov. 9, 2006

(86) PCT No.: PCT/EP2006/068286
§ 371 (c)(1),
(2), (4) Date: May 9, 2008

(87) PCT Pub. No.: WO2007/054534
PCT Pub. Date: May 18, 2007

(65) Prior Publication Data
US 2008/0229547 A1 Sep. 25, 2008

(30) Foreign Application Priority Data
Nov. 10, 2005 (FR) .................................... 05 53425

(51) Int. Cl.
*A47H 15/00* (2006.01)
(52) U.S. Cl. .................. 16/96 R; 16/97; 16/91; 16/102
(58) Field of Classification Search .................. 16/96 F, 16/97, 98, 91, 102, 106, 107, 107 R; 49/404, 49/409, 410, 420, 366, 380; 160/185, 199, 160/345, 346, 330, 206; 244/118.5, 118.6, 118.2, 118.1, 117 R, 120
See application file for complete search history.

(56) References Cited

U.S. PATENT DOCUMENTS

| | | | | |
|---|---|---|---|---|
| 2,619,916 A * | 12/1952 | Rainier | ...................... | 104/172.3 |
| 3,102,607 A * | 9/1963 | Roberts | ........................... | 186/40 |
| 3,696,890 A * | 10/1972 | Armstrong | ...................... | 186/40 |
| 3,855,941 A * | 12/1974 | Fromme et al. | ............... | 105/150 |
| 3,999,630 A * | 12/1976 | McPhee | .......................... | 186/40 |
| 4,208,755 A * | 6/1980 | Shepherd | ........................ | 15/160 |
| 4,509,888 A | 4/1985 | Sheek | | |
| 5,291,687 A * | 3/1994 | Abad | .............................. | 49/404 |
| 5,524,548 A * | 6/1996 | Fox | ................................. | 104/89 |
| 5,797,575 A | 8/1998 | Clausen | | |
| 5,816,534 A | 10/1998 | Schumacher | | |
| 6,523,779 B1 | 2/2003 | Michel | | |
| 2004/0016080 A1* | 1/2004 | De Oliveira | ...................... | 16/97 |

FOREIGN PATENT DOCUMENTS

DE     41 19 623 C1    10/1992

(Continued)

*Primary Examiner* — Chuck Y. Mah
(74) *Attorney, Agent, or Firm* — Young & Thompson

(57) ABSTRACT

An improved arrangement for a transverse dividing element includes an upper cross beam (32), each free end of the cross beam being guided longitudinally by way of an associated guiding structure. The guiding structure includes a slide having a groove in which a free end (34) of the cross beam (32) can slide longitudinally, the free end being equipped with guiding (92, 100) and a locking (102, 104) element. The transverse dividing element can be used to guide an upper cross beam supporting a transverse element that is used to divide the internal space of an aircraft cabin.

14 Claims, 12 Drawing Sheets

FOREIGN PATENT DOCUMENTS

| | | |
|---|---|---|
| DE | 94 07 645.6 | 8/1994 |
| DE | 296 02 58 U1 | 5/1996 |
| EP | 1 342 662 A1 | 9/2003 |
| FR | 2 728 860 A1 | 7/1996 |
| FR | 2 729 171 A1 | 7/1996 |
| FR | 2 791 031 | 9/2000 |
| WO | 99/04122 | 1/1999 |
| WO | 03/004304 A1 | 1/2003 |

* cited by examiner

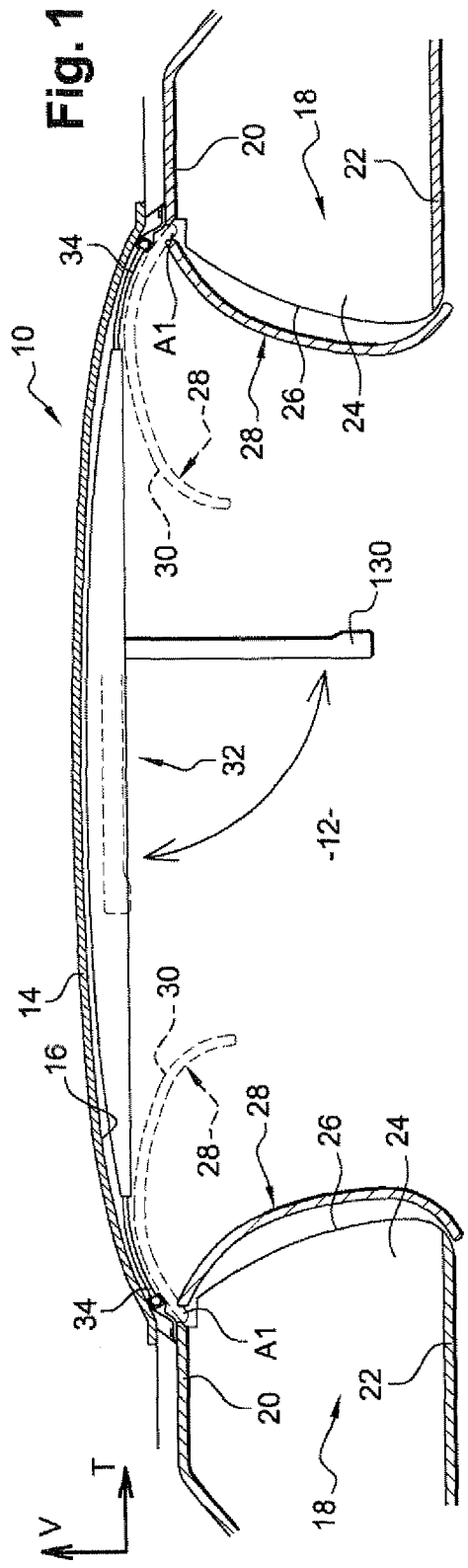
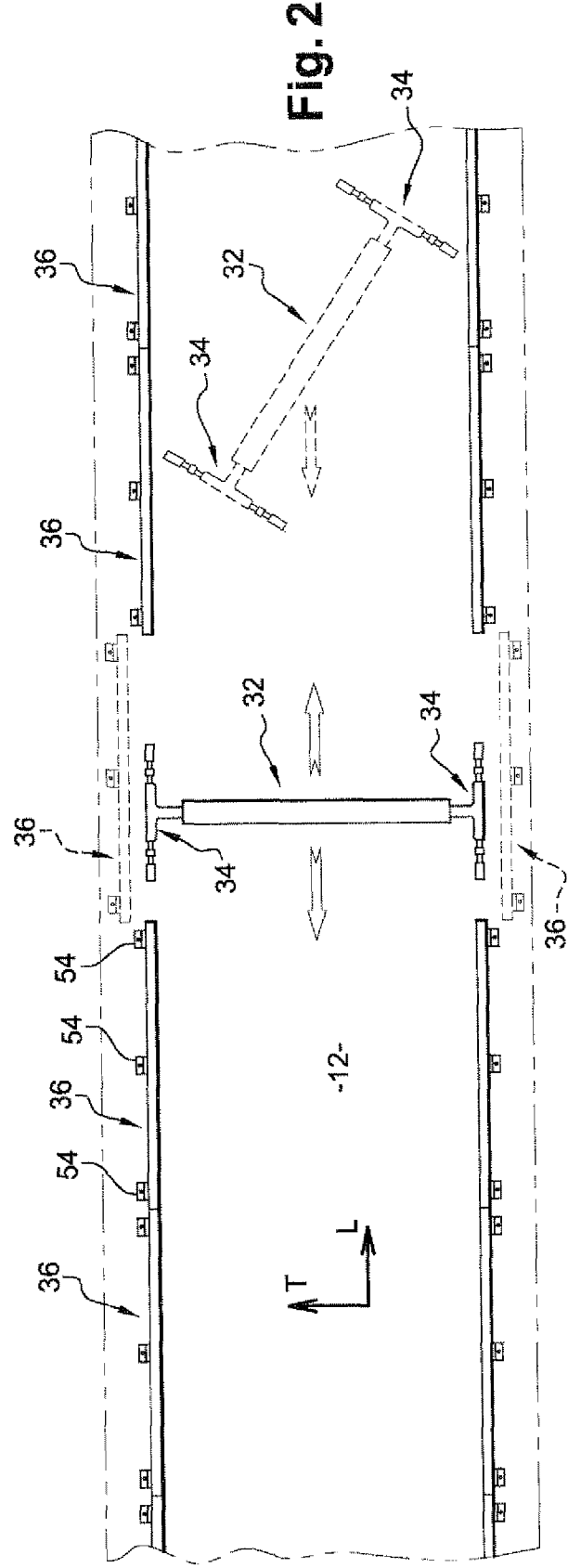

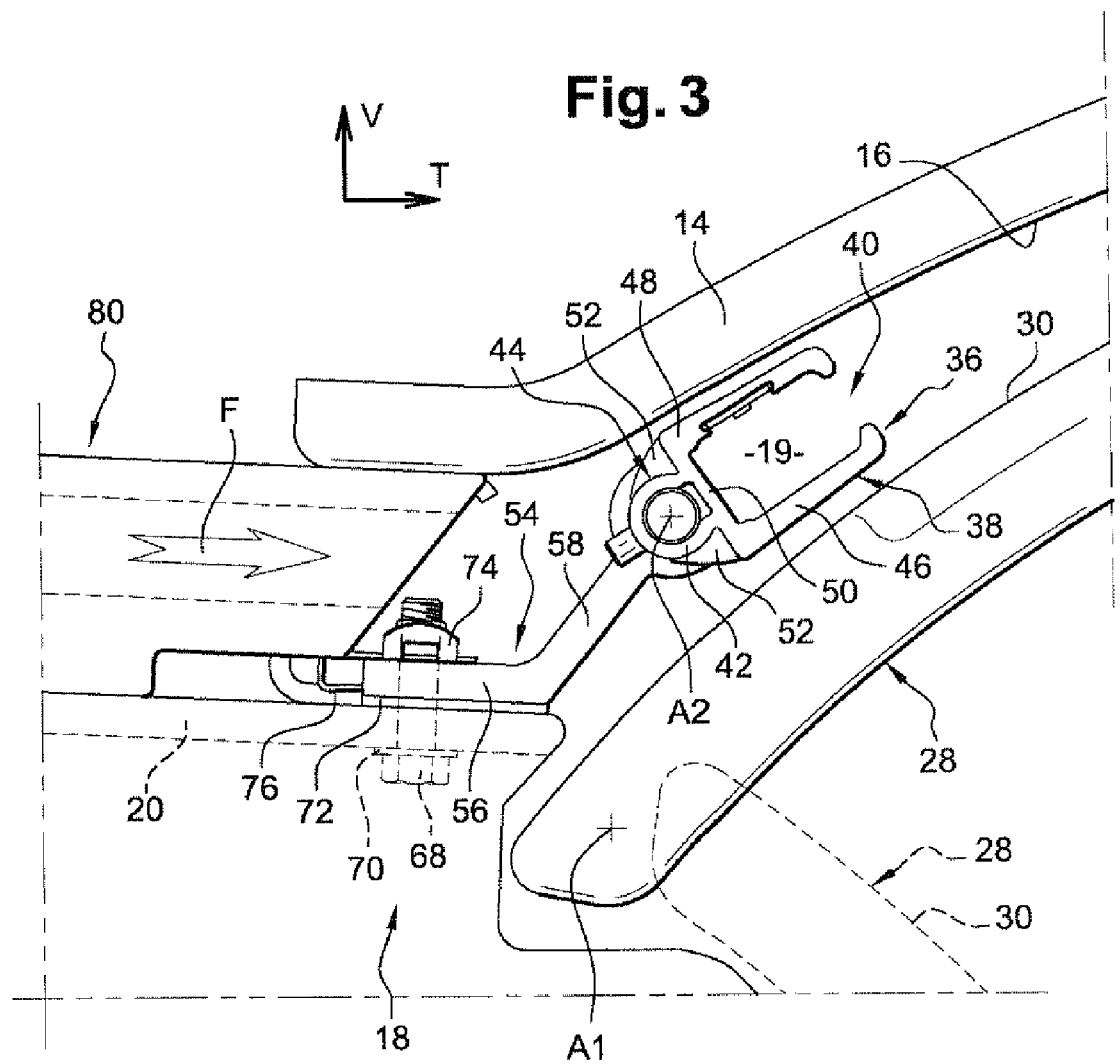

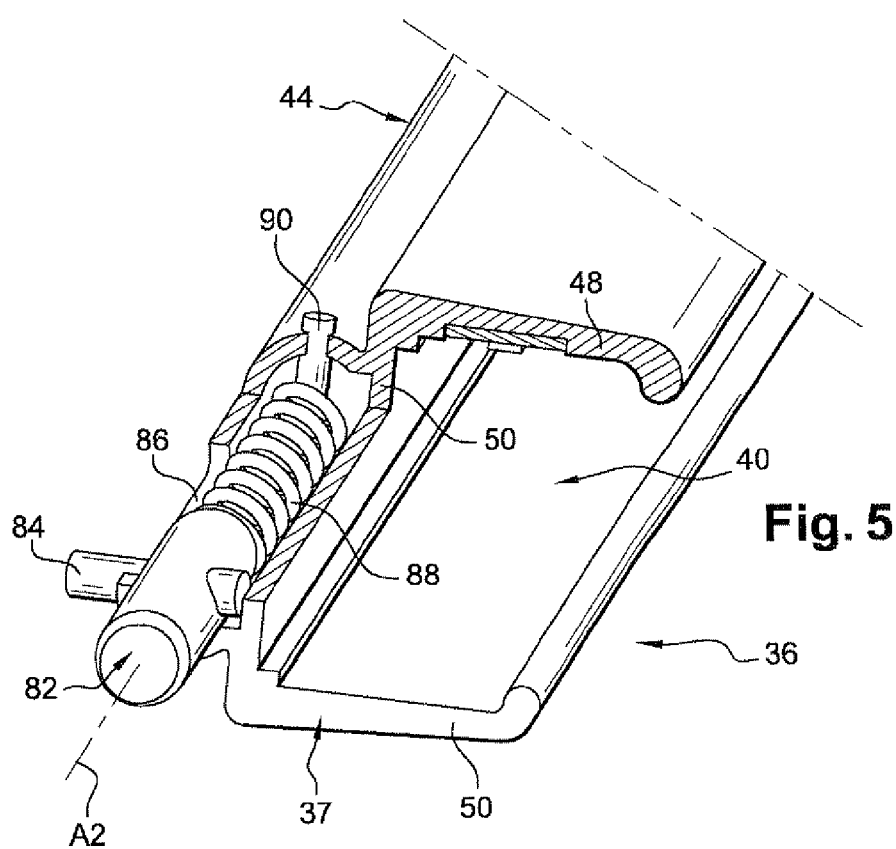
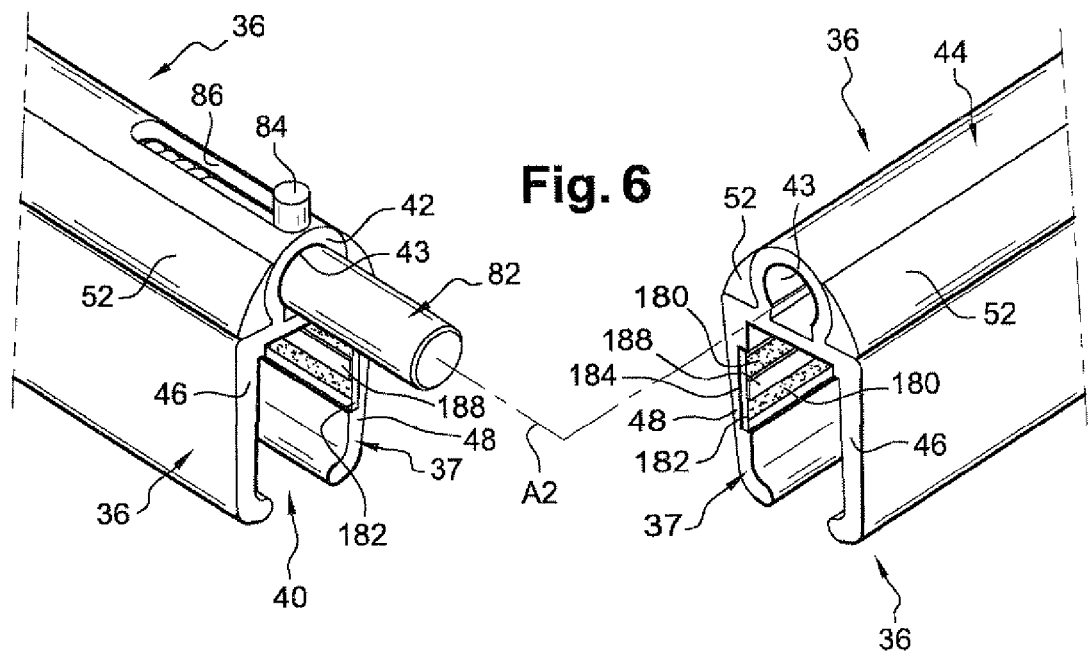

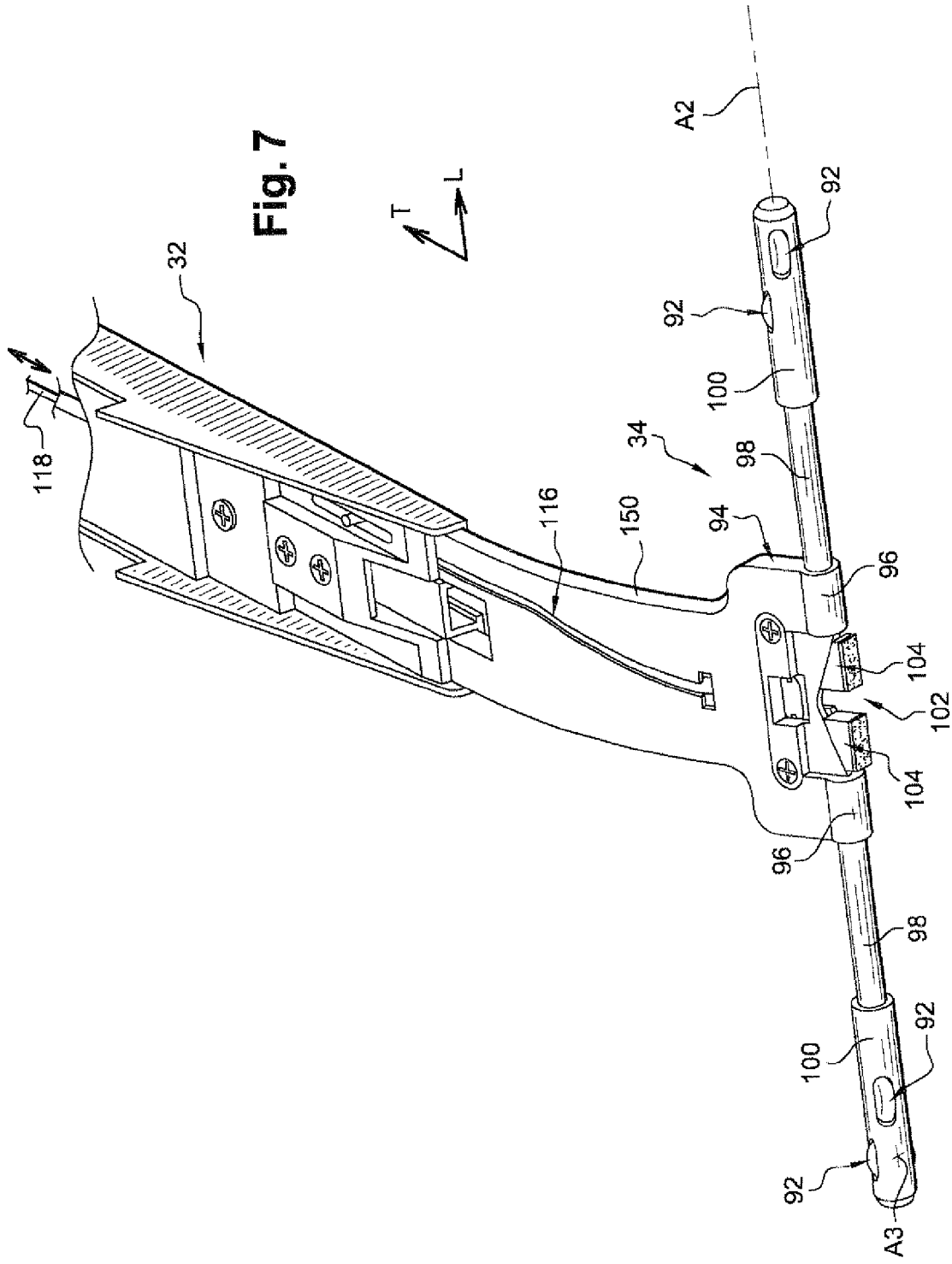

ASSEMBLY FOR GUIDING THE LONGITUDINAL SLIDING MOVEMENT OF A SUB-ASSEMBLY

TECHNICAL FIELD OF THE INVENTION

The present invention relates to an assembly for guiding the longitudinal sliding movement of a sub-assembly.

The invention is applicable in the field of transportation and vehicle cabins, and relates in particular to an assembly for guiding a top crossmember supporting a transverse element for dividing up the interior space of an aircraft cabin.

A movable separating device such as that described for example in document FR-A-2,791,031 makes it possible, since it carries a partition or curtain, to separate two classes in the cabin of an airliner.

PRIOR ART

Examples of documents that are known are U.S. Pat. No. 5,816,534 and U.S. Pat. No. 5,086,540 which describe and illustrate an arrangement for dividing up the interior space of an aircraft cabin.

The transverse dividing element comprises a top transverse supporting crossmember which is adjacent to the inside wall of the ceiling of the cabin, each free end of which is guided longitudinally by means of an associated guide structure situated for example in a space or area intermediate between the tops of the bins of an associated row of bins and a nearby portion of the ceiling trim panels.

A guide rail comprises a groove whose inside wall defines longitudinal guide ways and/or raceways for complementary elements carried by a guide runner and/or rolling-contact runner arranged at an associated free end of the crossmember.

The layout of such an arrangement, and in particular that of the top supporting crossmember or beam and its guide means and their engaging and securing means must in particular permit.
a) electrical power to be supplied to the transverse dividing element;
b) very easy handling of the transverse dividing element so that its longitudinal position in the cabin can be modified during use;
c) a very high level of modularity of the various guiding and connecting structures.

SUMMARY OF THE INVENTION

The invention provides an assembly for guiding the longitudinal sliding movement of a sub-assembly, especially that of a top crossmember for supporting a transverse element for dividing up the interior space of an aircraft cabin, of the type that comprises a guide rail comprising a groove whose inside wall defines longitudinal guide ways and/or raceways for complementary elements carried by a guide runner and/or rolling-contact runner connected to said sub-assembly, characterized in that the body of the rail comprises a longitudinal front groove which is open in a transverse direction, and in that the guide runner fits into the groove of the associated rail and has at least one system for locking the runner engaged in the rail in any longitudinal position.

Other features of the invention are as follows:
the locking system comprises at least one locking shoe which, under the action of an operating mechanism, is movable between a retracted position and a locked position in which the shoe engages by friction with a locking surface belonging to the body of the rail;
the locking shoe comprises a locking sole capable of engaging with a longitudinal planar locking track formed in the groove;
the locking shoe comprises a locking sole capable of engaging with a longitudinal locking track formed outside of the groove;
the guide runner comprises rolling elements arranged at its opposite longitudinal ends and capable of rolling along longitudinal raceways formed in the groove;
the raceways are longitudinal cylindrical arcs, and in that the rolling elements each comprise a pair of mutually oblique rollers;
the inside wall of the groove has at least one longitudinal electrically conducting track contacted by at least one electrical contact element carried by the guide runner and connected electrically to at least one electrical and/or electronic component associated with said sub-assembly;
said electrical contact element is a sliding contact;
the runner supports a block which supports said electrical contact element and which is movable transversely between a retracted position of rest, in which said electrical contact element is not in contact with the associated conducting track, and an advanced position of contact;
the movements of the movable block between its two positions are controlled by the action of said operating mechanism of said locking shoe or shoes;
the movable block is returned elastically to its advanced position of contact;
the guide runner comprises a brush for cleaning said conducting track or tracks.

BRIEF DESCRIPTION OF THE DRAWINGS

Other features and advantages of the invention will become clear on reading the following detailed description, for an understanding of which the reader should refer to the appended drawings, in which:

FIG. 1 is a diagrammatic view in cross section on a vertical transverse plane of a central-aisle aircraft cabin laid out in accordance with the teachings of the invention;

FIG. 2 is a diagram illustrating the general layout of the arrangement showing in particular the top transverse crossmember and its two opposite longitudinal guide structures;

FIG. 3 is a detail view on a larger scale showing part of a guide structure with a ceiling trim panel and an overhead stowage bin;

FIG. 5 is a larger-scale perspective detail view with partial cutaway showing a longitudinal end of a guide rail with its means of alignment with another rail;

FIG. 6 is a diagrammatic perspective view from another angle of view showing how the means of alignment of two consecutive rails engage with each other;

FIG. 7 is a large-scale perspective view of one of the two guide runners provided at one of the two opposite transverse ends of the top crossmember;

DETAILED DESCRIPTION OF THE DRAWINGS

Figure 4:
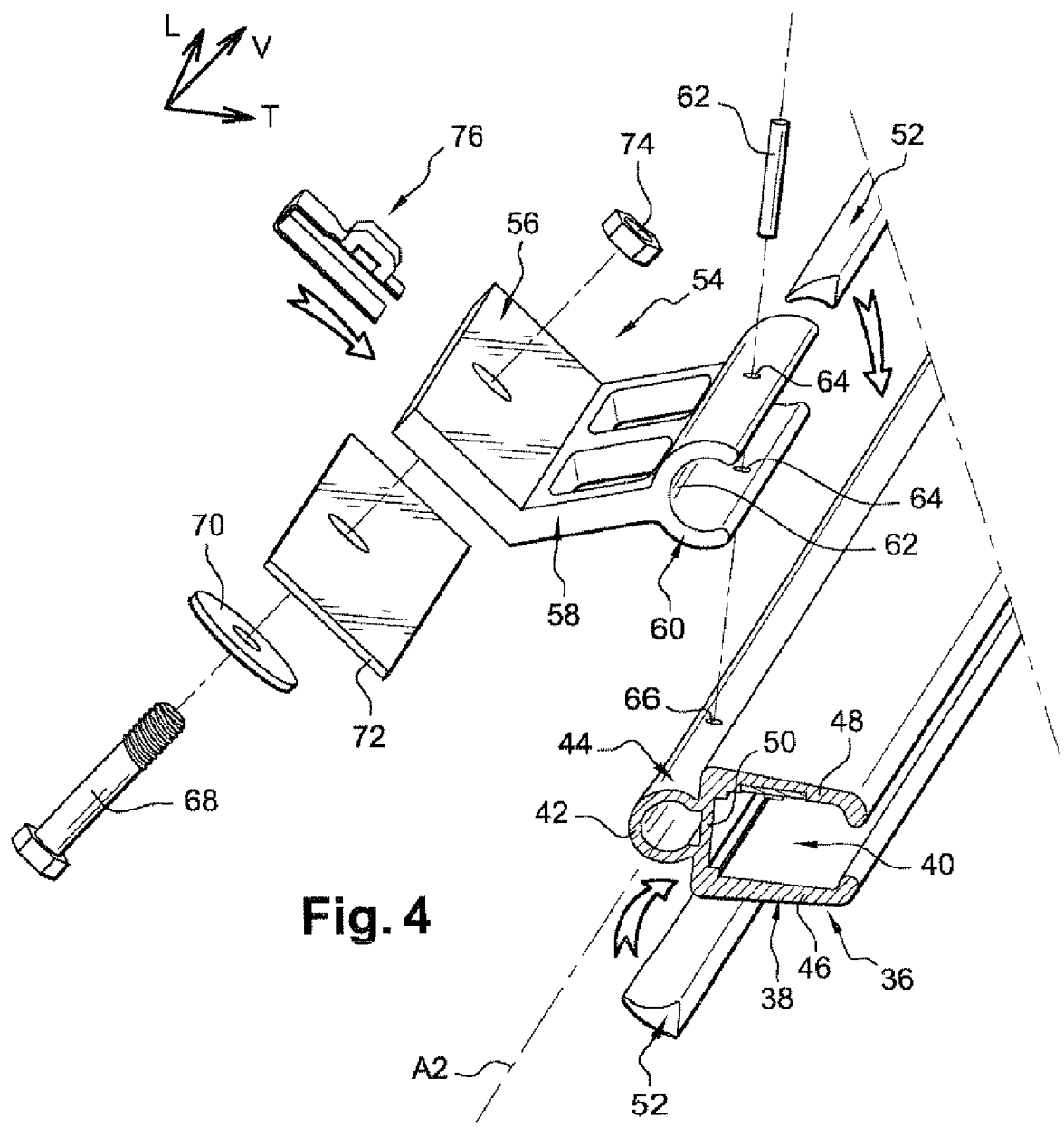
FIG. 4 is an exploded perspective view of the main components illustrated in FIG. 3.

In the following description, identical, similar or analogous components will be indicated by the same reference numbers.

The terms longitudinal transverse and vertical will be adopted without implying any limitation, chiefly with reference to the L, V, T trihedral indicated in the figures, the vertical and horizontal orientations being those corresponding to the current orientation in an aircraft cabin, with the longitudinal direction corresponding to the length of the cabin.

Shown diagrammatically in FIG. 1 is the top of the cabin 10 of an airliner with a central aisle 12.

The interior space or cabin is in part delineated by ceiling trim panels 14 extending transversely across the full width of the top of the cabin. The panels 14 are defined on their interior side by their inside walls 16 which form the inside wall of the cabin ceiling.

On either side, that is transversely on the left and right, when viewing FIG. 1, the top of the cabin in this case has overhead stowage bins 18.

As in the prior art, the bins 18 of the left-hand and right-hand rows are longitudinally adjacent and run all the way along the length of the cabin, above the seats, in order to give passengers as much stowage capacity as possible.

Each bin 18 has a structure or frame (not shown in detail) and is in part defined by a generally horizontal top wall 20, a generally horizontal bottom wall 22, and two transverse vertical walls 24 defining the length of the bin.

Each stowage bin 18 includes an open vertical face turned transversely toward the cabin interior to allow it to be loaded.

Each front open face 26 is closed by a door 28 which pivots as in the prior art about an upper longitudinal axis A1 between a down position in which the bin 18 is closed, as shown in FIG. 1, and an up position, shown in broken lines in FIG. 1, giving access to the open face 26, and therefore to the loading space of the stowage bin 18.

It is particularly important that the opening angle of each door 28 be as large as possible, and therefore that the external face 30 of each door 28, which has an arched convex profile, can come as close as possible to the adjoining portion of the inside wall 16 of the adjoining ceiling trim panel element 14.

FIG. 1 also shows the top transverse crossmember 32 forming the support element of a sub-assembly, such as a transverse element (not shown in the figures) allowing longitudinal division of the cabin. This may for example be a curtain hung as in the prior art beneath the crossmember 32.

The crossmember 32 is essentially a beam-like element arranged transversely and horizontally and extends transversely across the full width of the top of the cabin. The beam is practically adjacent to the inside wall 16 of the panels 14.

As in the prior art, each transverse free end 34 of the supporting crossmember 32 can be slid longitudinally in a guided manner along the cabin to allow it to occupy an infinite number of longitudinal positions of division of the interior cabin 12, chiefly in order to divide the latter up into zones of different classes.

Each longitudinal end is here formed into a longitudinal guide runner 34.

The design of the guide structures of the runners 34 will now be described in detail, with particular reference to FIGS. 3 and 4.

Since the design of these guide structures is modular and precisely identical at every point and on either side of the cabin, only the guide structure seen on the left-hand side of FIG. 1 will be described here.

As can be seen diagrammatically in FIG. 2, each guide structure is a series of rails 36, each of which is, as will be explained later, a length of a specific profile.

The modular design, made up of consecutive lengths 36 forming a continuous longitudinal rail, makes it easy in particular to fit out a cabin with this type of guide structure.

The modular design allows easy installation of the top crossmember by temporarily removing two opposing rails 36 as shown in broken lines in the center of FIG. 2.

The design of the guide structures described here allows ceiling panels to be removed without first removing or fitting the guide structures of the crossmember 32.

As can be seen in FIG. 4 in particular, each rail 36 is a length of profile comprising essentially a front part 38 defining a longitudinal groove 40 which is open transversely at the front, in direction "T", that is into the interior of the cabin, and a rear part 42 forming a longitudinal rib 44 extending rearward and therefore transversely opposed to the front groove 40.

The front part 38 here is roughly C-shaped in transverse section, and has for this purpose a lower wall 46 and an upper wall 48 which are generally parallel with each other and connected to each other at the rear by a vertical longitudinal wall 50 from which the rear part 42 extends in the opposite or rearward direction.

The part 42 here possesses, in transverse section, a circular profile and thus defines externally a rib 44 in the shape of a convex circular-section cylinder of longitudinal orientation along an axis A2.

Where its part 42 is not held by the fixing brackets, and in order to give the rail 36 an aerodynamic profile, the outside shape of its rear part is here completed by lengths of longitudinal aerodynamic fillers 52 which, as can be seen in FIG. 3 in particular, give an optimized aerodynamic outline to the rear part of the rail 36.

Figure 14:
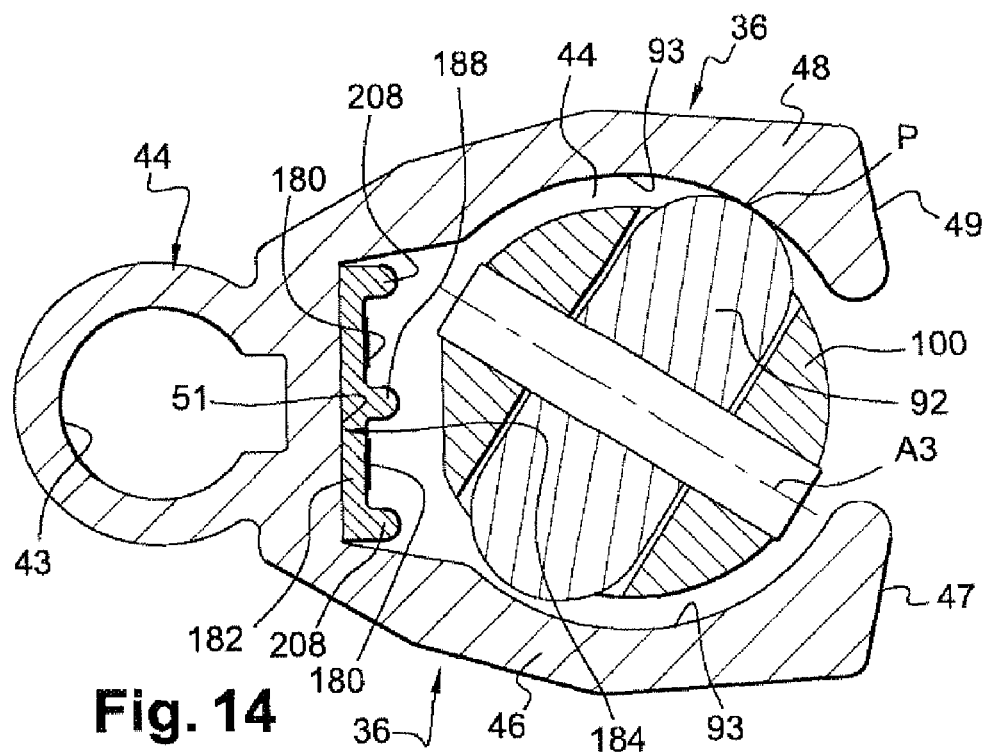
FIGS. 14 and 15 are two cross sections taken on a transverse vertical plane showing a first alternative form of the rail and showing the details of how the two rollers of a pair of associated rollers engage with their raceways.

It is also possible to give this optimized outline to the profile itself as shown for example in FIG. 14, without adding extra aerodynamic fillers.

As can be seen in FIG. 3, the body of each rail 36 is optimized to fit between the opposing portions of the interior face 16 of a panel 14 and an exterior face 30 of a stowage bin 18 door 28 when the door 28 is in the raised open position.

Fixing brackets 54 are used to install and locate the rail 36 in this area 19 when there is little available room.

Each rail 36, whose total length is approximately equal to the length of one stowage bin 18, is more particularly fixed to the top of the bin 18, in this case by means of three fixing brackets 54 set out in the longitudinal direction (see FIG. 2).

Each fixing bracket 54 is a molding or casting and comprises a horizontal arm 56 in the form of a plate which extends transversely and in the present case is fixed to the top of the bin 18, i.e. for example to the top partition 20. Each plate, or base 56, of a fixing bracket 54 is continued transversely inward by a fixing arm 58 extending in a generally inclined manner, for example at approximately 45°, as can be seen in FIG. 3, into the space delineated by the faces 16 and 30.

Each inclined fixing arm 58 ends in a longitudinal holder 60 that has an internal profile 62 shaped like a length of circular-section concave cylinder that fits around the convex cylindrical outline of the rib 44 so that the latter can slide along inside the holder 60.

The fixing brackets 54 are engaged, by longitudinal sliding along the axis A2, on the rib 44 of the body of a rail 36.

The means used for the longitudinal and angular immobilization of the holder 60 relative to the rib 44, and therefore to immobilize the rail 36 relative to the brackets 54 on which it is supported, consist of a radial pin 62 inserted through complementary holes 64 (in the holder 60) and 66 (in the rib 44).

This design offers great modularity for different applications based on standardized components in the form of the rails 36 and the brackets 54, because the holes 64 and 66 can be drilled in whatever numbers, positions and orientations are required to suit different applications.

The wide-open V design of each fixing bracket 54 makes possible, as can be seen in FIG. 3, an optimized layout of the rail 36 in the space between the panels 14 and the doors 28 of the bins 18.

The bases 56 are fixed to the top partitions 20 and/or to structural elements provided on the bins 18 for this purpose by, for example, a group of components comprising a bolt 68, a washer 70, a shin 72, a nut 74 and a cage 76 for positioning the nut, in order in particular to allow adjustment of the position in the three directions of each length of rail 36.

Existing holes in the stowage bins are preferably used for the above assembly and fixing.

As can be seen in FIG. 3, the design of the guide structures and fixing brackets is such that these assembled components offer as little disturbance as possible to the aerodynamic flow F passing out of air-conditioning nozzles 80 already present in the cabin: these eject the air transversely into the interior between the adjoining parts of the ceiling trim panels 14 and the upper faces of the stowage bins.

The optimized aerodynamic profiling of the rails 36, by means of for example the fillers 52, assists the emerging flow F.

In order to provide alignment and continuity between two longitudinally consecutive rails 36, alignment means may be provided, as illustrated in FIGS. 5 and 6 in detail, which in the form shown here consist essentially of a longitudinal alignment dowel 82.

Each dowel 82 is designed to slide longitudinally inside the hollow tubular cylindrical longitudinal end 43 of the rear part 42.

Each dowel 82 is thus a solid cylinder designed to fit into the hollow tubular cylindrical housing 43 of the rear part 42, from which it projects axially beyond the transverse end face 37 of the body of the rail 36.

Each dowel 82 is free to slide and is retained in the housing 43 by a radial retaining tooth 84 projecting radially through a longitudinal slot 86.

The dowel 82 is under permanent elastic stress from a helical spring 88 which is compressed and bears against a radial contact tooth 90 (see FIG. 5).

As will be readily understood from FIG. 6 the assembly and continuity of two consecutive rails 36 is achieved easily by means of the projecting part of the dowel 82 fitting into the opposing complementary part 43 of the transverse end of the other rail 36, each rail 36 thus being equipped with a dowel 82 at only one of its two opposite longitudinal ends.

The tooth 84 projecting out radially can also be used to retract the dowel 82 to facilitate removal of a rail 36 and its disconnection from the two rails 36 immediately before and after it.

In a variant (not shown), the spring system can be replaced by a radial screw for clamping the dowel 82 in its longitudinal position and/or by a key received and clamped in corresponding recesses in the rails to be assembled.

Figure 8:
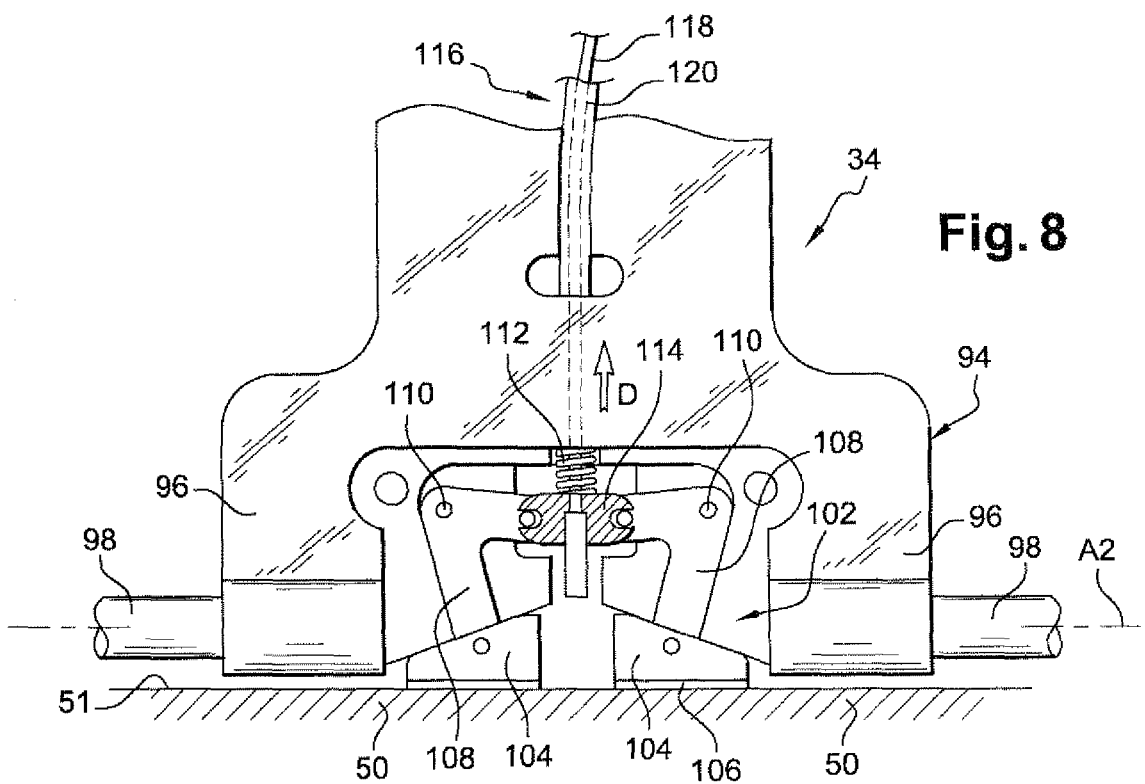
FIGS. 8 and 9 are detail views showing the controlled system for locking the longitudinal runner, in the locked and released positions of the guide runner, respectively.
Figure 9:
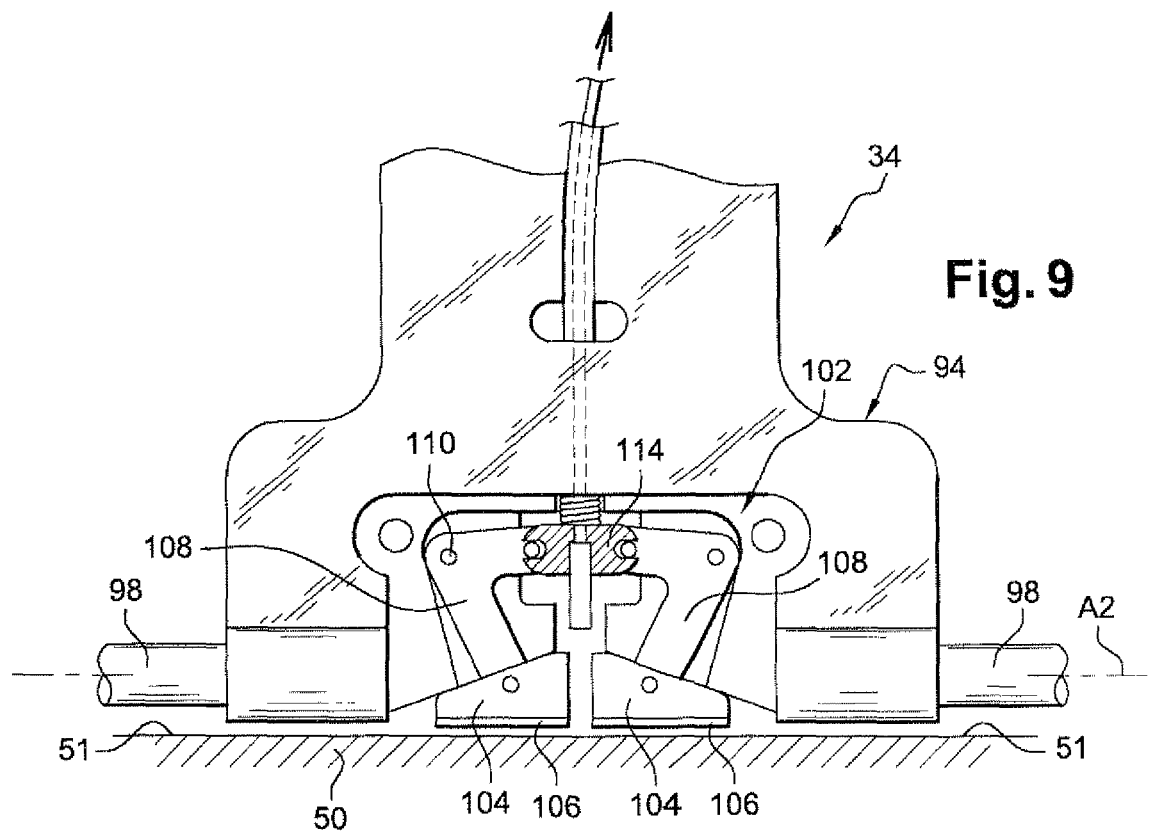

FIGS. 7-9 show a guide runner 34, here mounted on one of the opposing longitudinal transverse ends of the top crossmember 32.

Each runner 34 is designed to be slid longitudinally into the groove 40 of the associated rail 36.

For this purpose, guidance in this case is provided by rollers 92 arranged, in this case in pairs, at the opposite longitudinal ends of the runner 34.

For this purpose the runner 34 has a body 94 in the form of a U-shaped plate. Each of the free ends of the two parallel transverse arms 96 of the U-shaped body 94, which fits into the groove 40, supports a circular cylindrical longitudinal rod 98, and the rods 98 are lined up longitudinally on the axis A2 along which they slide.

At its free end, furthest from the arm 96, each rod 98 carries a guide sleeve 100 and each of these carries two rotating rollers 92.

Figure 11:
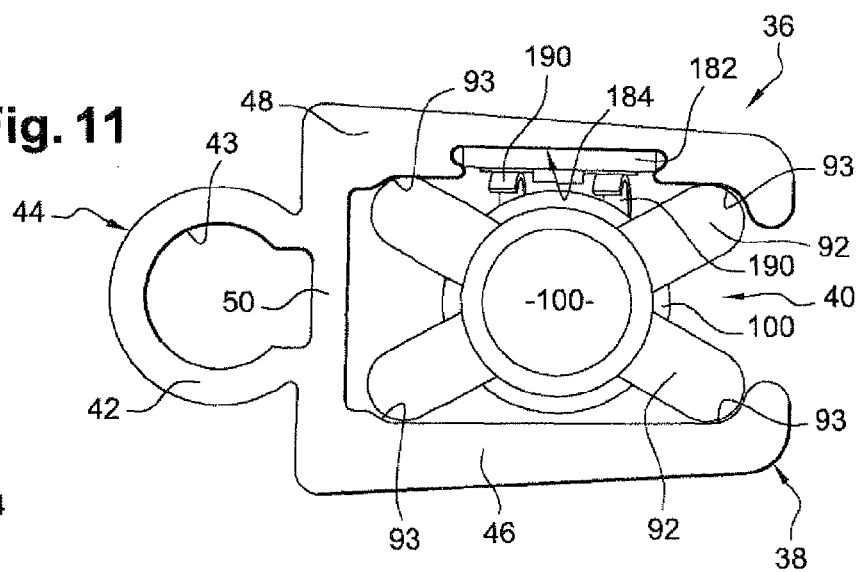
FIG. 11 is a longitudinal end view showing the runner engaged in the rail and the complementary electrical connection means.

The axes A3 of rotation of the two associated rollers of a pair of rollers 92 fitted to a sleeve 100 are of approximately radial orientation relative to the rod 98 and to the sleeve 100 and are preferably oriented at approximately 70° relative to each other (see FIG. 11). The angle is optimized to reduce the size and prevent sticking.

This construction makes it possible to have a large distance between the opposed pairs of rollers 92 and therefore excellent movement and great stability of the runner 34.

Figure 10:
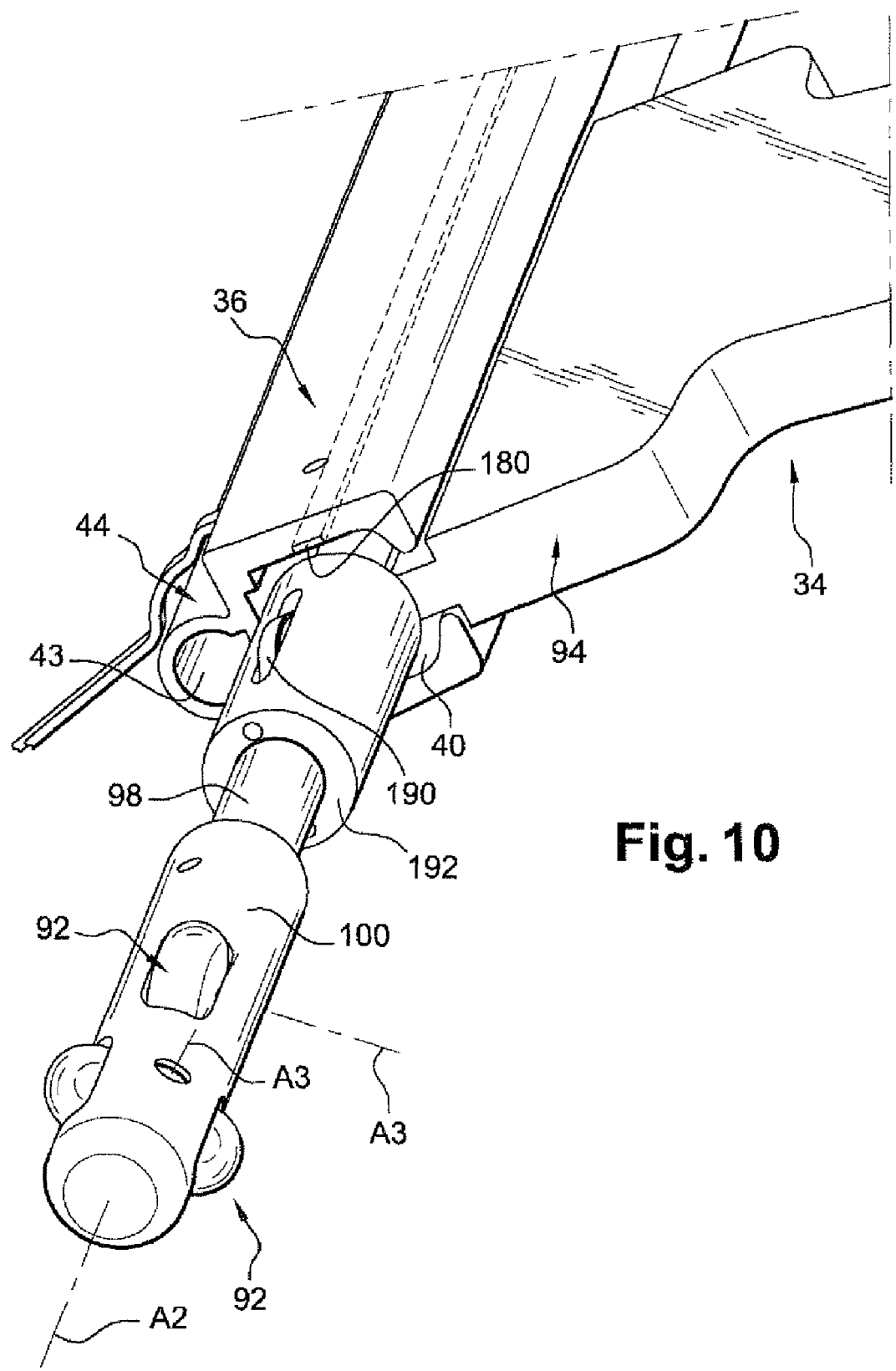
FIG. 10 is a larger-scale perspective view showing a guide runner and a complementary rail, with the electrical connection means between the runner and the guide rail.
Figure 12:
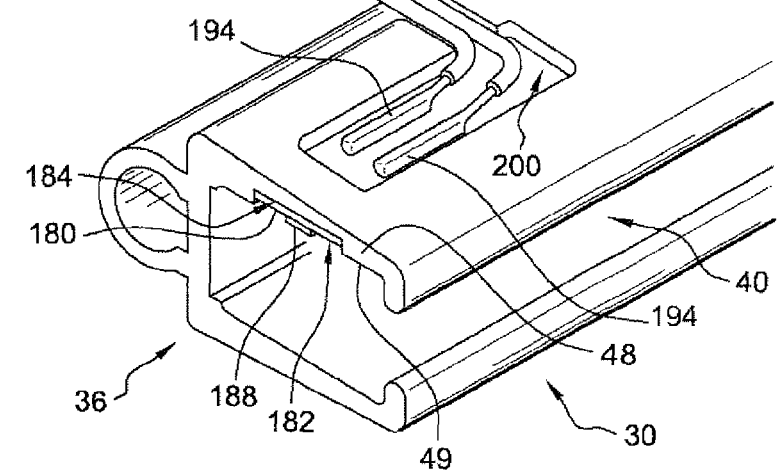
FIGS. 12 and 13 are a perspective view and a cross section taken on a transverse vertical plane showing the electrical connections of the conducting tracks of a guide rail.

As can be seen in FIGS. 10 and 12 in particular, the rollers 92 are inserted into the groove 40 of the rail 36, and the treads of the rollers 92 engage with raceways 93 of complementary concave outline, which are formed opposite them in the walls 46 and 48 of the groove 40 of the rail 36.

The construction is not of course limited to rollers: any other shape of rolling element such as balls can be used, the internal outline of the groove 40 being modified correspondingly to provide complementary raceways.

In order to immobilize the longitudinal position of the top crossmember 32, each guide runner 34 using the rollers 92 comprises in this case means 102 for locking the runner 34 relative to the rail 36 in which it is inserted.

The locking means 102 in this case are a system of two locking shoes 104.

Each locking shoe 104 has a flat locking sole 106 designed to engage with a locking track belonging to the rail 36.

The locking track is formed in this case in the groove 40 and consists of the flat longitudinal inside face 51 belonging to the longitudinal rear wall 50 of the rail 36.

Each locking shoe 104 pivots on an L-shaped locking lever 108 about an axis 110 orthogonal to the longitudinal direction of sliding.

Pivoting each lever 108 about its axis 110 either wedges the sole 106 against the locking track 51, or draws it back to release the runner 34, as can be seen in FIGS. 8 and 9.

The levers 108, and hence the shoes 104, are under permanent elastic stress to move them toward the locked position illustrated in FIG. 8 by a helical compression spring 112 acting on a balancing member 114 which pivots the two levers 108 simultaneously about their axes 110.

To release the runner 34, i.e. move the levers 108 and the shoes 104 to their back position illustrated in FIG. 9, the balancing member 114 must be pulled in a direction D indicated in FIG. 8 in opposition to the force of the spring 112, thereby moving the balancing member 114 and the shoes 104 to the back position illustrated in FIG. 9.

For this purpose the runner 34 is provided with a release cable 116 which is a pull-push type cable or "Bowden cable" comprising a core 118 connected to the balancing member 114 and a sheath 120 carried by the body 94 of the runner 34.

The shape of the soles 106 and the outline of the locking track or surface 51 may of course vary so long as they are still complementary.

Means (not shown in detail) are provided for simultaneously operating the cables 116 and comprise in particular a pivoting handle 130 hinged to the central part of the crossmember 32 and acting on the cables 116 through a mechanism.

The operating means consist of a mechanism formed in the central part of the body of the crossmember 32 and acting simultaneously on the cores 118 of both cables 116 which extend transversely in opposite directions.

The handle 130 is kept in its raised position—corresponding to the shoes 104 being locked, in which the handle extends generally horizontally inside the body of the crossmember of the body 32—by a catch which a member of the cabin staff can operate from the underside of the crossmember 32.

To release, or unlock, the crossmember 32, staff swing the handle 130 down until the handle is approximately vertical inside the cabin, at which point the runners 34 are free.

By swinging the handle 130 back up, the user moves the cores 118 of the cables 116 again until the two runners 34 are longitudinally locked. The movement of the handle 130 ends by engaging it again with the catch in its raised locked position.

To enable it to adapt to the dimensional changes, such as occur in flight, of the cabin structure, at least one of the two longitudinal ends of the crossmember is formed in two parts to allow the total transverse length of the crossmember to vary.

Each length of rail 36 here possesses two parallel longitudinal electrically conducting tracks which can be contacted by electrical contact elements on the guide runner 34 connected electrically to at least one receiving component belonging to the transverse dividing element.

This may be a light mounted on the crossmember and/or information display screens.

The conducting tracks thus provide power and/or electrical data signals.

Figure 13:
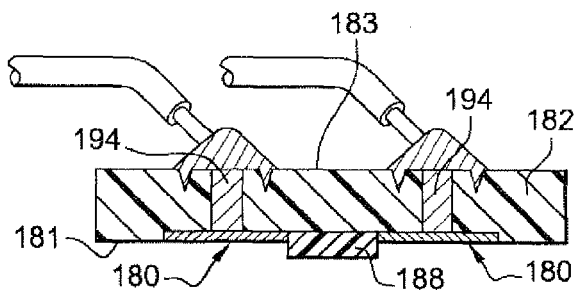

In the example shown in the figures, and especially FIGS. 6, 13 and 14, the two longitudinal conducting tracks 180 are two parallel planar tracks. Each conducting track 180 is formed on a face 181 belonging to a longitudinal flexible circuit ribbon 182 laid in a complementary channel 184 formed here on the inside face 49 of the upper longitudinal wall 48 of the front part of the profile 36 defining the groove 40.

The two conducting tracks 180 are electrically insulated from each other by a longitudinal insulating wall 188 formed in the present case by an insulating tape.

The tape forming the insulating wall 188 may also be made in the form of a bead of insulating material, e.g. a silicone-based material, which is deposited after the conducting tracks have been formed on the ribbon 182.

If there are two tracks 180 insulated by an insulating wall 188, the guide runner 34 will of course have two electrical contact elements, which in this case are two separate sliding contacts 190 shown diagrammatically in FIG. 12.

As the runner 34 travels longitudinally in either direction relative to the rail 36, the sliding contact or contacts 190 are in permanent contact with the associated conducting track or tracks 180.

FIG. 10 depicts a simplified variant in which there is only one conducting track 180 and the sliding contact is an elastically deformable contact leaf 190 carried by a sleeve 192 of the guide runner 34.

The tape forms a longitudinal insulating wall 188 that separates the tracks and in particular enables one track to be electrical power and another track signals transmission.

Each conducting track 180 may for example be formed advantageously on the inside face 181 of a longitudinal ribbon 182, which in this case may for example be a flexible circuit, that is laid in the channel 184 formed in the body of the rail 36.

The longitudinal channel 184 is advantageously formed integrally with the other parts of the profile in which each rail 36 is made.

As can be seen in FIG. 14, each conducting track 180 is connected locally to at least one conducting stud 194 on the outside face 183 of the flexible longitudinal circuit ribbon 182.

As can be seen in FIG. 13, each conducting stud is located near an associated longitudinal edge of the support ribbon 182.

It is thus possible to electrically connect each conducting track 180 with the exterior and/or with the aligned conducting track of the next length of rail body.

For this purpose the upper wall 48 defining the groove 40 of the body of the rail 36 has a vertical through well 200 which gives access to the studs 194 to allow each stud, and therefore each track 180, to be connected to a conducting wire or cable 202, each of which can be provided with a connector or socket 204.

As can be seen from the perusal of FIG. 6, each conducting track is made up of consecutive lengths, each formed on a flexible longitudinal circuit ribbon 182 on a rail 36, the ribbons 182 being housed longitudinally in line with each other in the channels 184 of the consecutive rails. Electrical connection between two consecutive ribbons and tracks is provided by conducting elements welded to the studs 194.

As can be seen in FIG. 12 and FIG. 10, the convex curved lengths of the elastically deformable leaves forming the sliding contacts 190 are ideally suited to engaging with the conducting tracks immediately opposite them.

In the embodiment illustrated in FIGS. 14-22, the outside faces of the walls 46 and 48 of the body of the rail 36 blend aerodynamically with the rear rib 44 and therefore do not require the addition of aerodynamic fillers.

In this case it is the inside face 51 of the vertical wall 50 which forms the rear 184 of the groove on which are two parallel longitudinal electrically conducting tracks 180 able to interact with electrical contact means.

Both tracks 180 are formed on a longitudinal support, which may be a flexible circuit ribbon or in a variant a rigid insulating support in the form of a ribbon 182 having projecting longitudinal lateral ribs 208 between which the tracks 180 are housed, and a central rib 188 which acts as the insulating wall separating the two tracks 180.

Here again, the lateral ribs 208 and the insulating central wall 188 may advantageously be formed by depositing beads of a silicone-based insulating material.

The raceways 93 consist in the present case of two paths in the shape of arcs of cylinders of approximately circular section formed in the opposing inside faces of the walls 46 and 48 of the front part 38, shaped to form the groove 40, of the rail 36.

The axes of the two raceways 93 approximately coincide with the central axis A2 of sliding.

The two rollers 92 are offset longitudinally and angularly from each other.

Figure 15:
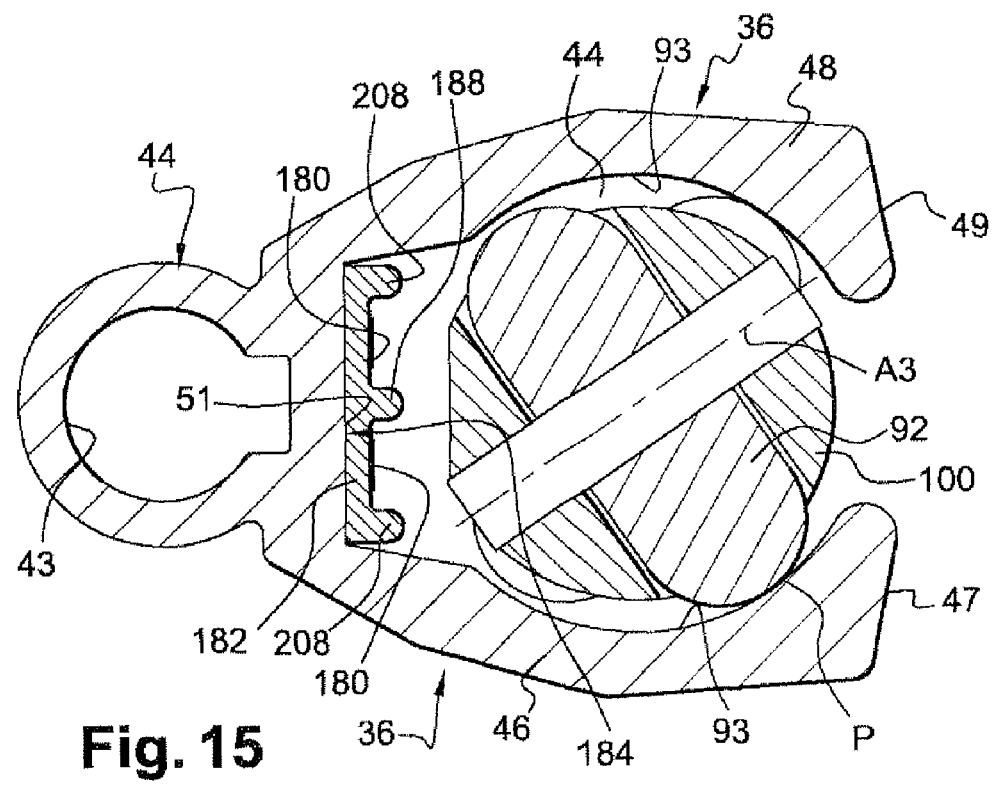
Figure 16:
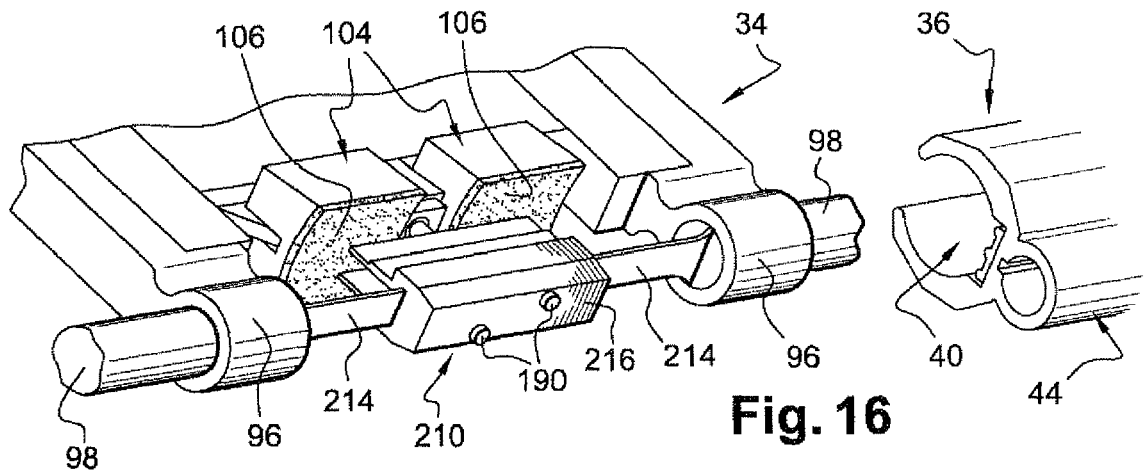
FIG. 16 is a partial perspective view showing another illustrative embodiment of a guide runner with its locking means and its built-in means of contact with the electrical tracks.

As FIGS. 14 and 15 show, each of the two rollers 92 of a given pair of rollers located at the free end of a rod 98 makes contact at only one point "P" with only one of the two raceways. This helps to improve the locating of the roller guide means and prevents sticking problems.

This system of two mutually oblique contact points, one above and one below, is of course reproduced in a similar fashion by the two rollers of the other pair of rollers of a runner 34.

In this embodiment, the two locking shoes 104 act not on a locking surface, such as the locking track 51 discussed above, situated inside the groove 40 of the rail 36, but with an opposing locking surface 47 and 49 of the body of the rail, outside of the groove.

Between its arms 96, the U-shaped body 94 of the runner 34 carries a suspended block 210 whose function is to be a mobile contact-carrying block moved transversely by the locking shoes 104. The planar soles 106 of the shoes 104 can act on the rear longitudinal face 212 of the block 210 to bring about a corresponding movement of the block 210 away from its rest position or released position illustrated in FIGS. 17 and 19.

The block 210 is suspended elastically between the arms 96 by two supporting leaf springs 214 attached to the arms 96.

In this rest position there is a gap between the front face 216 of the block 210 and the ribs 208. A compression spring 218 is inserted between the balancing member and the block 210 to close the gap.

Figure 18:
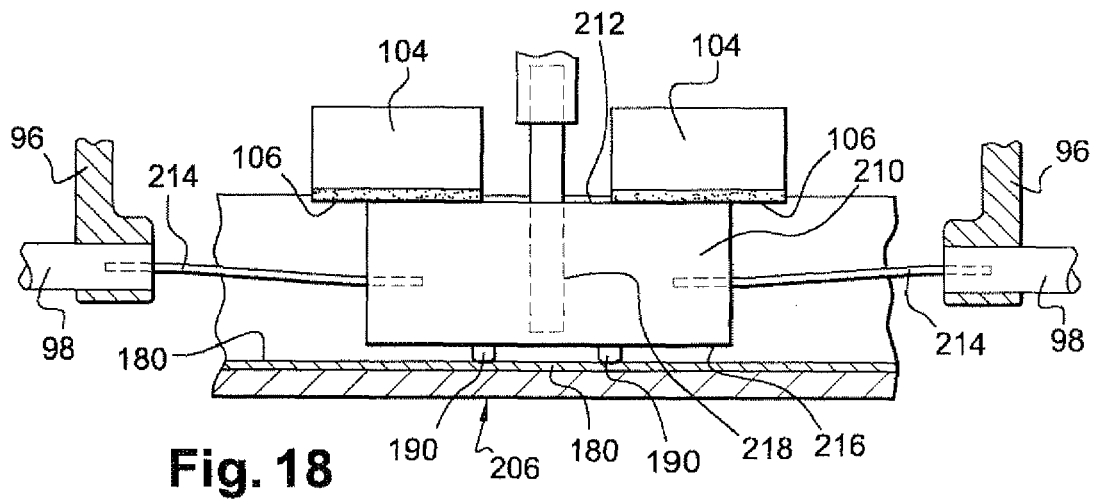
Figure 20:
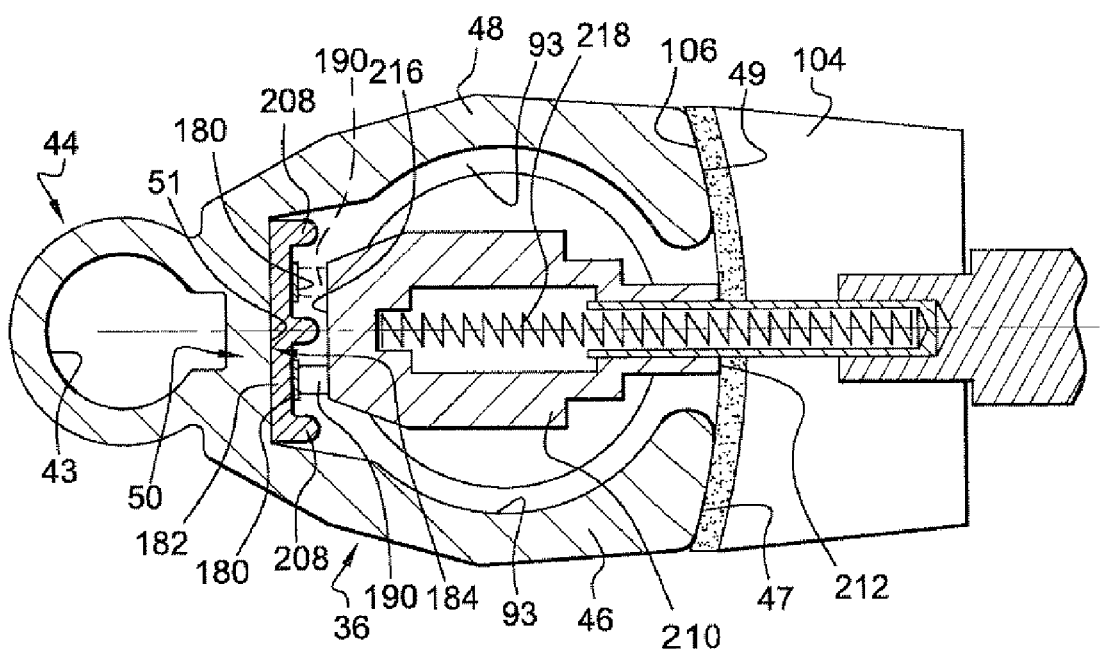

When the shoes 104 are operated, as before, in order to lock the system, they act progressively on the block 210 to move it transversely toward the back, to the locked position illustrated in FIGS. 18 and 20, by elastically deforming the supporting leaves 214.

The block 210 carries electrical contacts. For this purpose it is made of an insulating material and it has two electrical contact elements which in this case have two electrical contact studs 190, each capable of contacting a conducting track 180.

Each contact stud 190 projects forward beyond the front face 216 of the block and is also connected, by wires (not shown) to the body of the runner 34 and hence to the cross-member.

Figure 17:
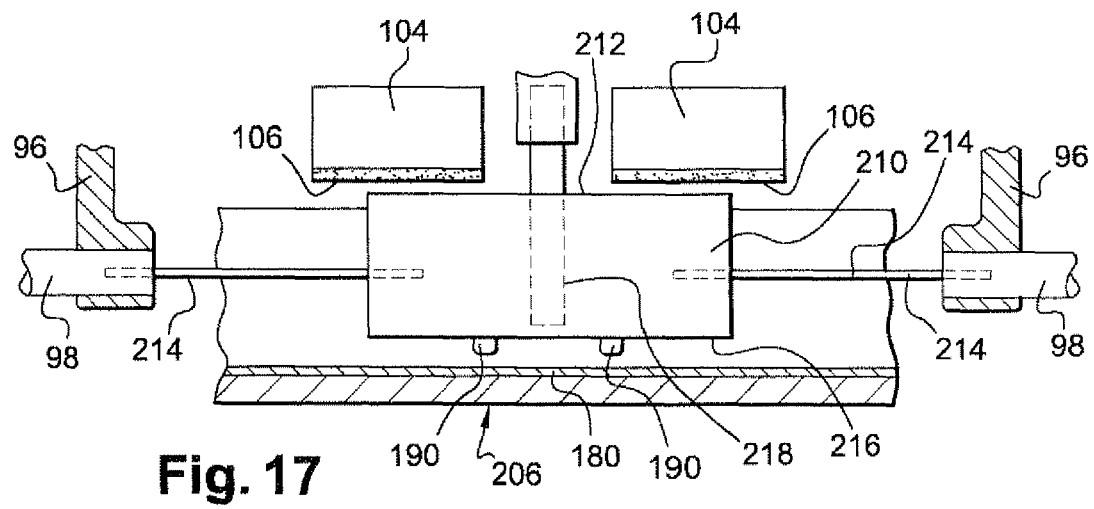
FIGS. 17 and 18 are diagrammatic top views showing two positions of the locking shoes and of the locking and contact-making block shown in FIG. 16.
Figure 19:
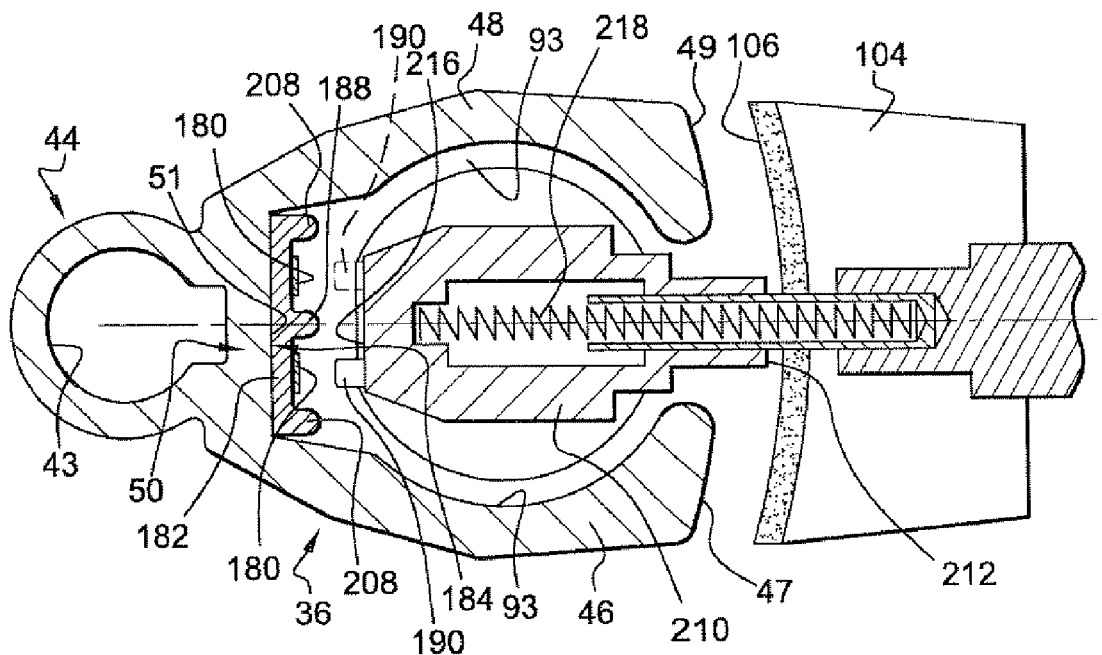
FIGS. 19 and 20 are two larger-scale cross-sectional views corresponding to FIGS. 17 and 18.

In the retracted position shown in FIGS. 17 and 19, the electrical contact studs 190 are not in contact with the tracks 180 and therefore, when the runner moves longitudinally, there is no friction and therefore no wear on either the tracks 180 or on the electrical contact studs 190.

With the block 210 in the forward locked position shown in FIGS. 18 and 20, each stud 190 is in electrical contact with an associated track.

Figure 21:
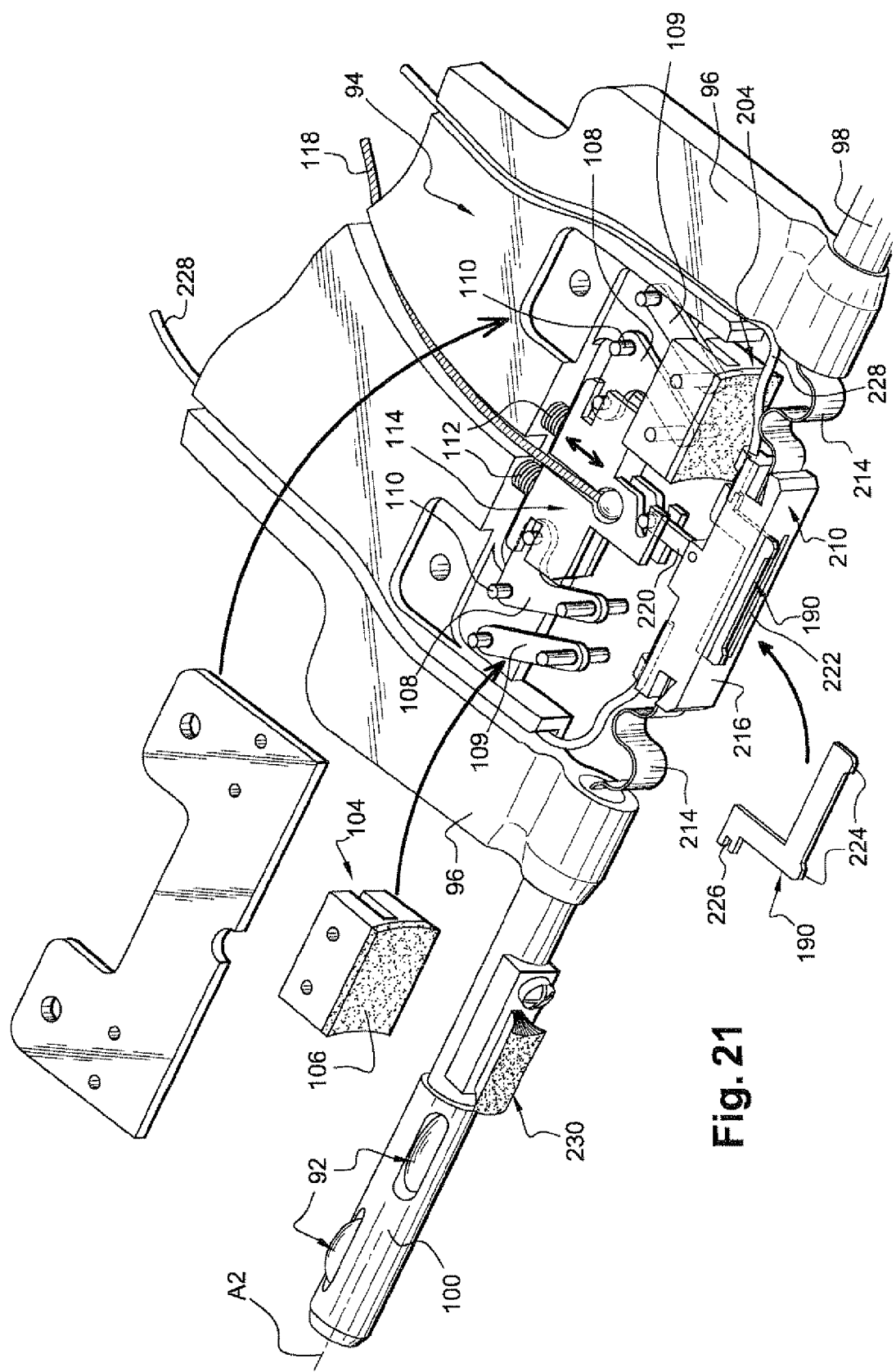
FIG. 21 is an exploded perspective view of the main components of a guide runner and its contact-making block in a preferred embodiment of the invention.

In the preferred embodiment partially illustrated in FIG. 21, and by comparison with the construction illustrated in FIGS. 16-20, it is the balancing member 114 that acts directly on the contact-carrying block 210, via a control link or bar 220 whose rear end is hinged to the block 210 and whose front end is hinged to the balancing member 114.

The spring-loaded return of the balancing member 114 is here provided by a pair of helical compression springs 112 inserted between the back of the U-shaped body 94 of the runner and the opposing face of the balancing member 114.

To ensure that they have good elastic return capacity and good reliability, the leaf springs 214 are shaped sinusoidally.

To move each locking shoe 104, each pivoting L-shaped lever 108 is provided with an additional link 109 pivoted to the body 94 and to the locking shoe 104.

Consequently each locking shoe 104 is pivoted to the body 94 by a parallelogram system in such a way that the active locking face, which is the sole 106, is always parallel to itself and parallel to the locking tracks 47 and 49 on which the sole 106 acts when the runner 34 is in the locked position.

Each electrical contact element 190 is in this case a contact plate accommodated in a longitudinal slot 222 of the block 210 and has two contact humps 224. Each contact plate 190 has a tab 226 for connection with an electrical cable 228.

Each runner 34 is in this case equipped with two brushes 230 for cleaning the conducting tracks 190,

The invention claimed is:

1. An assembly for guiding the longitudinal sliding movement of a sub-assembly (32), comprising:
   a guide rail (36) comprising a groove (40) with an inside wall defining a longitudinal guideway (93), the body of the guide rail (36) comprising a longitudinal front groove (40) open in a transverse direction; and
   a guide runner (34) configured to cooperate with the groove (40) of the guide rail (36) comprising at least one locking system (102) for locking the runner (34), when the runner is engaged in the guide rail (36), in any longitudinal position relative to the guide rail (36), the guide runner (34) further comprising rolling elements (92) each comprised of a pair of mutually oblique rollers configured to roll along longitudinal guideway (93) of the groove (40),
   wherein the guideway (93) comprises opposing inner walls each having faces with cylindrical arcs of approximately circular section, and
   wherein the locking system (102) comprises at least one locking shoe (104) movable between i) a retracted position and ii) a locked position in which the shoe engages by friction with a locking surface of the body of the guide rail (36).

2. The arrangement as claimed in claim 1, wherein the locking shoe (104) comprises a locking sole (106), the locking surface comprises a longitudinal planar locking track (51) formed in the groove (40), and the locking shoe is configured to engage with the longitudinal planar locking track (51).

3. The arrangement as claimed in claim 2, wherein the inside wall of the groove (40) has at least one longitudinal electrically conducting track (180) contacted by at least one electrical contact element (190) carried by the guide runner (34) and connected electrically to at least one electrical and/or electronic component associated with said sub-assembly.

4. The arrangement as claimed in claim 1, wherein the locking shoe (104) comprises a locking sole (106), the locking surface comprises a longitudinal locking track (47, 49) formed outside of the groove (40), and the locking shoe is configured to engage with the longitudinal locking track (47, 49).

5. The arrangement as claimed in claim 4, wherein the inside wall of the groove (40) has at least one longitudinal electrically conducting track (180) contacted by at least one electrical contact element (190) carried by the guide runner (34) and connected electrically to at least one electrical and/or electronic component associated with said sub-assembly.

6. The arrangement as claimed in claim 1, wherein the rolling elements (92) are arranged at opposite longitudinal ends (100) of the of the guide runner.

7. The arrangement as claimed in claim 6, wherein the inside wall of the groove (40) has at least one longitudinal electrically conducting track (180) contacted by at least one electrical contact element (190) carried by the guide runner (34) and connected electrically to at least one electrical and/or electronic component associated with said sub-assembly.

8. The arrangement as claimed in claim 1, wherein the inside wall of the groove (40) has at least one longitudinal electrically conducting track (180) contacted by at least one electrical contact element (190) carried by the guide runner (34) and connected electrically to at least one electrical and/or electronic component associated with said sub-assembly.

9. The arrangement as claimed in claim 8, wherein said electrical contact element (190) is a sliding contact.

10. The arrangement as claimed in claim 8, wherein the runner (34) supports a movable block (210) configured to support said electrical contact element (190) and which is movable transversely between i) a retracted position of rest, in which said electrical contact element is not in contact with the at least one conducting track (180), and ii) an advanced position of contact with the at least one conducting track (180).

11. The arrangement as claimed in claim 10, wherein movements of the movable block (210) between the retracted position and the advanced position are controlled by an action of an operating mechanism (108, 114) of said locking shoe (34).

12. The arrangement as claimed in claim 11, wherein the movable block (210) is configured to return elastically to its advanced position of contact.

13. The arrangement as claimed in claim 10, wherein the movable block (210) is configured to return elastically to the advanced position of contact.

14. The arrangement as claimed in claim 8, wherein the guide runner (34) comprises a brush (230) for cleaning said conducting track (180).

* * * * *